(12) United States Patent
Strong et al.

(10) Patent No.: US 11,527,024 B2
(45) Date of Patent: Dec. 13, 2022

(54) SYSTEMS AND METHODS FOR CREATING AUTOMATED FAUX-MANUAL MARKINGS ON DIGITAL IMAGES IMITATING MANUAL INSPECTION RESULTS

(71) Applicant: Pictometry International Corp., Rochester, NY (US)

(72) Inventors: Shadrian Strong, Bellevue, WA (US); Bill Banta, Bellevue, WA (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 17/032,313

(22) Filed: Sep. 25, 2020

(65) Prior Publication Data

US 2021/0110585 A1 Apr. 15, 2021

Related U.S. Application Data

(60) Provisional application No. 62/905,803, filed on Sep. 25, 2019.

(51) Int. Cl.
*G06T 11/20* (2006.01)
*G06N 20/00* (2019.01)
*G06F 40/109* (2020.01)

(52) U.S. Cl.
CPC .......... *G06T 11/203* (2013.01); *G06F 40/109* (2020.01); *G06N 20/00* (2019.01)

(58) Field of Classification Search
CPC ...... G06T 11/203; G06F 40/109; G06N 20/00
(Continued)

(56) References Cited

U.S. PATENT DOCUMENTS 5,108,206 A 4/1992 Yoshida
5,327,342 A 7/1994 Roy
(Continued)

FOREIGN PATENT DOCUMENTS

GB 2554361 A 4/2018
WO WO 2006/120724 11/2016

OTHER PUBLICATIONS

Krizhevsky et al., "ImageNet Classification with Deep Convolutional Neural Networks", Advances in Neural Information Processing Systems 25, pp. 1097-1105, Curran Associates, Inc., 2012.
(Continued)

*Primary Examiner* — Thomas J Lett
(74) *Attorney, Agent, or Firm* — Dunlap Codding, P.C.

(57) ABSTRACT

Methods and systems for automated faux-manual image-marking of a digital image are disclosed, including a method comprising obtaining results of an automated analysis of one or more digital image indicative of determinations of structure abnormalities of one or more portions of a structure depicted in the one or more digital image; applying automatically, on the one or more digital image, with one or more computer processors, standardized markings indicative of the location in the image of the structure abnormalities of the structure depicted in the image; and generating, automatically with the one or more computer processors, one or more faux-manual markings by modifying one or more of the standardized markings, utilizing one or more image-manipulation algorithm, wherein the faux-manual markings mimic an appearance of manual markings on the structure in the real world.

18 Claims, 13 Drawing Sheets

(58) Field of Classification Search
USPC .......................................................... 345/467
See application file for complete search history.

(56) References Cited

U.S. PATENT DOCUMENTS

| | | | |
|---|---|---|---|
| 7,180,072 | B2 | 2/2007 | Persi et al. |
| 7,424,133 | B2 | 9/2008 | Schultz et al. |
| 7,483,570 | B1 | 1/2009 | Knight |
| 8,462,992 | B2 | 6/2013 | Chen et al. |
| 9,230,514 | B1 | 1/2016 | Bacus et al. |
| 9,536,148 | B2 * | 1/2017 | Gross ................ G06Q 30/0643 |
| 9,805,261 | B1 | 10/2017 | Loveland et al. |
| 10,181,079 | B2 | 1/2019 | Labrie et al. |
| 10,635,903 | B1 * | 4/2020 | Harvey ................ G06T 7/0002 |
| 10,977,490 | B1 | 4/2021 | Bokshi-Drotar et al. |
| 10,984,182 | B2 * | 4/2021 | Loveland ............... G06T 11/60 |
| 2004/0223645 | A1 | 11/2004 | Cliff |
| 2009/0067725 | A1 | 3/2009 | Sasakawa et al. |
| 2009/0103794 | A1 | 4/2009 | Sathyanarayana |
| 2013/0155109 | A1 | 6/2013 | Schultz et al. |
| 2015/0213315 | A1 * | 7/2015 | Gross ................... G06T 7/0004 |
| | | | 382/159 |
| 2015/0227808 | A1 | 8/2015 | Zharkov |
| 2015/0302529 | A1 * | 10/2015 | Jagannathan .......... G06Q 40/08 |
| | | | 705/4 |
| 2015/0347872 | A1 | 12/2015 | Taylor et al. |
| 2016/0098589 | A1 | 4/2016 | Brieu |
| 2016/0217537 | A1 | 7/2016 | Childs |
| 2016/0239956 | A1 | 8/2016 | Kang et al. |
| 2016/0259994 | A1 | 9/2016 | Ravindran et al. |
| 2016/0371801 | A1 | 12/2016 | Dawson |
| 2017/0091627 | A1 | 3/2017 | Terrazas et al. |
| 2017/0193829 | A1 * | 7/2017 | Bauer ................. G06K 9/00805 |
| 2018/0089531 | A1 | 3/2018 | Geva et al. |
| 2018/0089833 | A1 | 3/2018 | Lewis et al. |
| 2018/0247121 | A1 * | 8/2018 | Loveland ............... B64C 39/024 |
| 2019/0065907 | A1 | 2/2019 | Strong et al. |
| 2019/0155973 | A1 | 5/2019 | Morczinek et al. |
| 2019/0271550 | A1 | 9/2019 | Breed et al. |
| 2020/0019825 | A1 | 1/2020 | Frei et al. |
| 2020/0348132 | A1 | 11/2020 | Du et al. |
| 2021/0065563 | A1 * | 3/2021 | Bauer ................. G06K 9/00805 |
| 2021/0158609 | A1 | 5/2021 | Raskob et al. |

OTHER PUBLICATIONS

Long et al., "Fully Convolutional Networks for Semantic Segmentation", IEEE Conference on Computer Vision and Pattern Recognition, Jun. 2015.

Nielsen, Michael A., "Neural Networksand Deep Learning", Determination Press, 2015, updated Jan. 19, 2017.

Simonyan et al., "Very Deep Convolutional Networks for Large-Scale Image Recognition", International Conference on Machine Learning, 2015.

Liu et al., "SSD: Single Shot MultiBox Detector", Computer Vision—ECCV 2016, Lecture Notes in Computer Science, vol. 9905, Dec. 2016.

Mountrakis et al., "Support vector machines in remote sensing: A review," ISPRS Journal of Photogrammetry and Remote Sensing vol. 66, Issue 3, May 2011, pp. 247-259.

Galarreta et al., "UAV-based urban structural damage assessment using object-based image analysis and semantic reasoning," Natural Hazards and Earth System Sciences, Jun. 2015.

Goodfellow, et al., "Generative Adversarial Networks," Departement d'informatique et de recherche operationnelle Universite de Montreal, Jun. 2014.

"Artificial Neural Networks Technology," [online], archived on Nov. 23, 2015, available at: <https://web.archlve.org/web/20151123211404/http://www2.psych.utoronto.ca/users/relngold/course> (Year: 2015).

Marr, Bernard, "A Short History of Machine Learning—Every Manager Should Read," [online], Feb. 19, 2016, available at: < https://www.forbes.com/sltes/bernardmarr/2016/02/19/a-short-history-of-machine-learning-every-manager-should-read/#70f07e5415e7 > (Year: 2016).

Galarreta et al., "UAV-based Urban Structural Damage Assessment Using Object-based Image Analysis and Semantic Reasoning," Nat. Hazards Earth Syst. Sci., 15, 1087-1101; Copernicus Publications; 2015.

Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, The Netherlands, Apr. 2014.

European Patent Office acting as the International Search Authority; International Search Report and Written Opinion regarding Application No. PCT/US2020/052714, dated Feb. 2, 2021.

Borchert, Matt; "How-to Create a Hand Drawn Effect in Adobe Illustrator," Screenshot and transcript of video posted to https://www.youtube.com/watch?v=r-GYR7z2MOc (last visited Apr. 8, 2021), posted Dec. 9, 2013.

Kang et al., "Building Instance Classification Using Street View Images," ISPRS Journal of Photogrammetry and Remote Sensing, 145, 44-59, Elsevier, Mar. 2018.

USPTO, Advisory Action regarding U.S. Appl. No. 15/634,879, dated Jan. 19, 2022.

Omniearth, Inc., Response to Jan. 19, 2022 Advisory Action and Sep. 14, 2021 Office Action regarding U.S. Appl. No. 15/634,879, filed Feb. 14, 2022.

USPTO, Notice of Allowance for U.S. Appl. No. 15/634,879, dated Mar. 17, 2022.

* cited by examiner

SYSTEMS AND METHODS FOR CREATING AUTOMATED FAUX-MANUAL MARKINGS ON DIGITAL IMAGES IMITATING MANUAL INSPECTION RESULTS

CROSS-REFERENCE TO RELATED APPLICATIONS

This application claims priority to the provisional patent application identified by U.S. Ser. No. 62/905,803, filed Sep. 25, 2020, titled "Systems and Methods for Creating Automated Faux-Manual Markings on Digital Images Imitating Manual Inspection Results", the entire content of which is hereby expressly incorporated herein by reference.

BACKGROUND

Traditionally, when structures were damaged, an inspector was sent to the site of the structure and manually inspected the structure to determine the location, type, and/or severity of the damage (which may be referred to herein as "anomalies"). The inspector would typically physically mark the structure to identify the damaged areas, the type of damage, and/or the severity of the damage. For example, as shown in the examples of FIGS. 1-3, the inspector might mark the damaged area (D) with manual visual indicators (M), such as chalk, paint, or other marking material, directly on the structure. The inspector would then take pictures (P) with a camera of the marked damaged areas. Those pictures (P) would be used as part of a report regarding the damage.

For instance, when a roof of the structure was damaged, such as in a hail storm, the inspector would climb up on the roof of the structure, inspect the roof for hail damage, identify the hail damage, and physically mark on the roof the damaged areas with the manual visual indicators (M), such as with markings circling the damaged areas. Typically, such markings are uneven and imperfectly drawn (for example, with gaps or overlaps). The inspector would then take pictures (P) with a camera, while on the roof, of those circled areas on the roof to show where and/or how much damage was done to the roof by the hail. Damage to other parts of the structure was also noted, marked, and captured in photographs in the same or a similar manner.

However, more and more inspections of structures are now done through image analysis. The digital images used for image analysis may be captured by cameras mounted on one or more of manned aircraft, unmanned aircraft, and automobiles. In some cases, the digital images may be captured by a person on the ground, such as with a camera or a computer-based device including a camera (e.g., a smart phone or computer tablet). Capturing the digital images without requiring a person to climb onto the roof increases safety by eliminating the risks associated with climbing on roofs, or without requiring a person to visit the site at all. Further, digital analysis reduces manpower requirements. Additionally, unlike human-based determinations, automated digital image analysis does not present the bias of a single individual.

The image analysis of the captured digital images may be done using a variety of methods, such as one or more of machine learning, artificial intelligence, computer analysis, manual analysis of the digital images, and combinations of the methods.

Machine Learning (ML) is generally the scientific study of algorithms and statistical models that computer systems use in order to perform a specific task effectively without using explicit instructions, but instead relying on patterns and inference. It is considered a subset of artificial intelligence (AI). Machine learning algorithms build a mathematical model based on sample data, known as "training data", in order to make predictions or decisions without being explicitly programmed to perform the task. Machine learning algorithms are used in a wide variety of applications where it is infeasible to develop an algorithm of specific instructions for performing the task, such as in email filtering, computer vision, and digital imagery analysis. Machine Learning algorithms are commonly in the form of an artificial neural network (ANN), also called a neural network (NN). A neural network "learns" to perform tasks by considering examples, generally without being programmed with any task-specific rules. The examples used to teach a neural network may be in the form of truth pairings comprising a test input object and a truth value that represents the true result from the test input object analysis. When a neural network has multiple layers between the input and the output layers, it may be referred to as a deep neural network (DNN).

For some implementations of machine learning (ML) with digital imagery, a computer system may be trained to deconstruct digital images into clusters of aggregated pixels and statistically identify correlations in the clusters. The correlations may be iteratively evaluated and "learned" from by the computer system, based on a directive to classify a set of patterns as a specific thing. For example, the directive could be to classify the set of patterns to distinguish between a cat and dog, identify all the cars, find the damage on the roof of the building in the clusters, and so on.

Over many imaged objects, regardless of color, orientation, or size of the object in the digital image, these specific patterns for the object are mostly consistent—in effect they describe the fundamental structure of the object of interest. For an example in which the object is a cat, the computer system comes to recognize a cat in a digital image because the system encompasses the variation in species, color, size, and orientation of cats after seeing many digital images or instances of cats. The learned statistical correlations are then applied to new data (such as new digital images) to extract the relevant objects of interest or information (e.g., to identify a cat in a new digital image).

Convolutional neural networks (CNN) are machine learning models that have been used to perform this function through the interconnection of equations that aggregate the pixel digital numbers using specific combinations of connecting the equations and clustering the pixels, in order to statistically identify objects (or "classes") in a digital image. Exemplary uses of Convolutional Neural Networks are explained, for example, in "ImageNet Classification with Deep Convolutional Neural Networks," by Krizhevsky et al. (Advances in Neural Information Processing Systems 25, pages 1097-1105, 2012); and in "Fully Convolutional Networks for Semantic Segmentation," by Long et al. (IEEE Conference on Computer Vision and Pattern Recognition, June 2015); both of which are hereby incorporated by reference in their entirety herein.

Generative adversarial networks (GANs) are neural network deep learning architectures comprising two neural networks and pitting one against the other. One neural network, called a Generator, generates new data instances, while another neural network, called a Discriminator, evaluates the new data instances for authenticity, that is, the Discriminator decides whether each data instance belongs to the training data set or not. The creation of a generative adversarial network is explained, for example, in "Generative Adversarial Networks," by Goodfellow et al. (Departement d'informatique et de recherche operationnelle Universite de Montreal, June 2014).

When using computer-based supervised deep learning techniques, such as with a CNN, for digital images, a user provides a series of examples of digital images of the objects of interest to the computer system and the computer system uses a network of equations to "learn" significant correlations for the object of interest via statistical iterations of pixel clustering, filtering, and convolving.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest. The relationships between the layers of the neural network, such as that described in the binary output, may be referred to as the neural network model or the machine learning model.

In the technological field of remote sensing, digital images may be used for mapping geospatial information. Classifying pixels in an image for geospatial information purposes has been done through various techniques. For example, some CNN-based techniques include Semantic Segmentation (also known as pixel-wise classification or individual pixel mapping) using fully convolutional neural networks (FCN) as described in "Fully Convolutional Networks for Semantic Segmentation," by Long et al., referenced above. In this technique, each pixel in the image is given a label or classification based on training data examples, as discussed in the general overview above. This technique is computationally intensive, as it requires resources of computational space, time, and money to assess each individual pixel.

A technique that traditionally existed outside of the technological field of geospatial mapping is General Image Classification using a convolutional neural network (CNN), such as that described by Simonyan et al. in the article "Very Deep Convolutional Networks for Large-Scale Image Recognition" (International Conference on Machine Learning, 2015), which is hereby incorporated by reference in its entirety herein. In General Image Classification, an entire image is given a generalized label, rather than individual pixels being labeled. This is typically a much simpler algorithm than the FCN Semantic Segmentation, and so may require less computation. However, this method provides less information about a digital image, as it is limited to the digital image as an aggregated whole as a generalization rather than identifying particulars, such as where objects in the scene are located within the digital image or where particular information is located within the digital image.

Another technique includes an object characteristic estimation method comprising sub-dividing one or more digital image depicting one or more object of interest into segments; assessing, automatically, the contents depicted in one or more of the segments using General Image Classification; and determining, automatically, the level of confidence that the one or more of the segments have one or more predetermined characteristics, such as one of a plurality of predetermined characteristics each having different extent and/or severity of the characteristic of type of characteristic. The predicted results may then be spatially re-joined after processing to generate a map of predictions with confidence scores indicative of how statistically likely the prediction is true.

Digital image analyses can result in highly accurate and precise determinations of damage to structures, without human bias, which may be summarized in reports output to the consumer that identify the location, type, and/or severity of damage to structures. These reports may be generated automatically and typically have identical and repetitive automated markings indicating the damaged areas. However, consumers recognize from these markings that the analyses of damage were done through image analyses and through semi-automated or fully automated methods. This often results in consumer distrust of the results of the analyses, as a result of distrust in the ability of an automated system to produce as accurate and precise of an inspection as a human inspector. The consumer distrust may dissuade report preparers, such as insurance companies, from using automated image analysis, despite advantages in precision, accuracy, cost, and employee safety.

However, prior art computer systems are not capable of mimicking, or creating the appearance of, manual-determinations and manual-markings for depictions of structures having abnormalities. Prior art computer systems and computer methods simply output markings that are easily recognizable as machine-generated.

Therefore, what is needed are systems and methods that solve these technical problems with prior-art computers, in order to find a technological solution to how to create with a computer system an appearance of damage reports created by manual inspection, even though those reports are automatically created through computer-based systems and methods, for example, through machine learning and/or artificial intelligence-based digital-image analysis systems and methods.

SUMMARY

The problems involved in computer-generated-based markings on digital images of abnormality determinations on structures depicted in digital images from digital image analysis are solved with the methods and systems described herein, including the automated generation of faux-manual markings on the digital images for the abnormalities of the structure(s) depicted in the digital images imitating manual inspection results.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
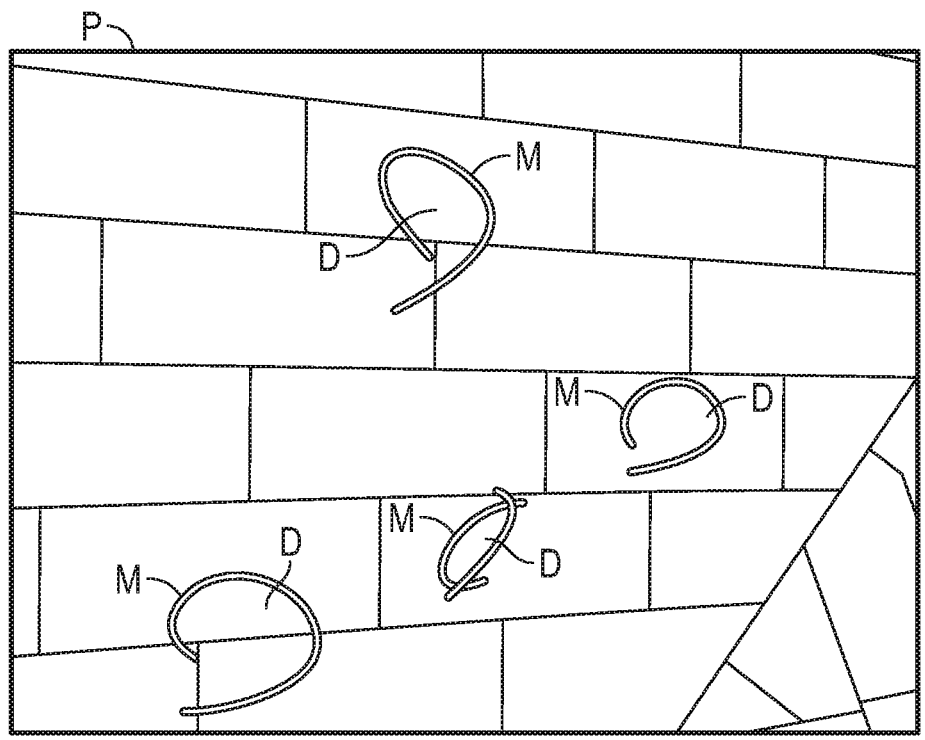
FIG. 1 is an exemplary prior art picture of a roof with manual markings.
Figure 2:
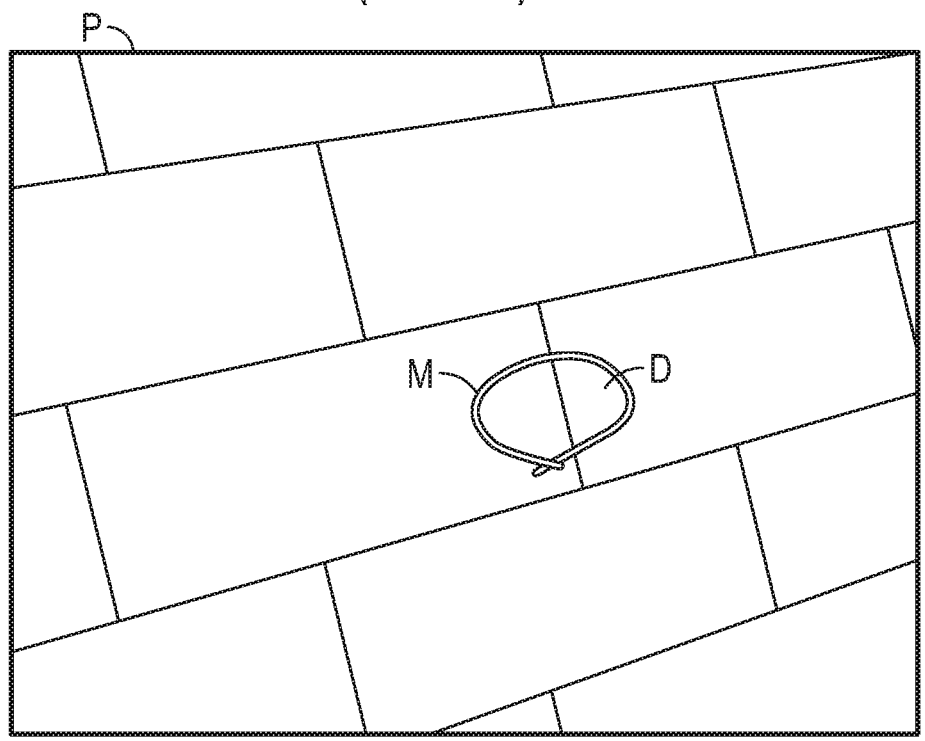
FIG. 2 is another exemplary prior art picture of a roof with manual markings.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although damage to residential structures may be used as an example, the methods and systems may be used to automatically assess other characteristics (for example, but not limited to, types, features, abnormalities, or conditions) of other man-made or natural objects, non-exclusive examples of which include vehicles, commercial buildings and infrastructure including roads, bridges, utility lines, pipelines, utility towers. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

Figure 3:
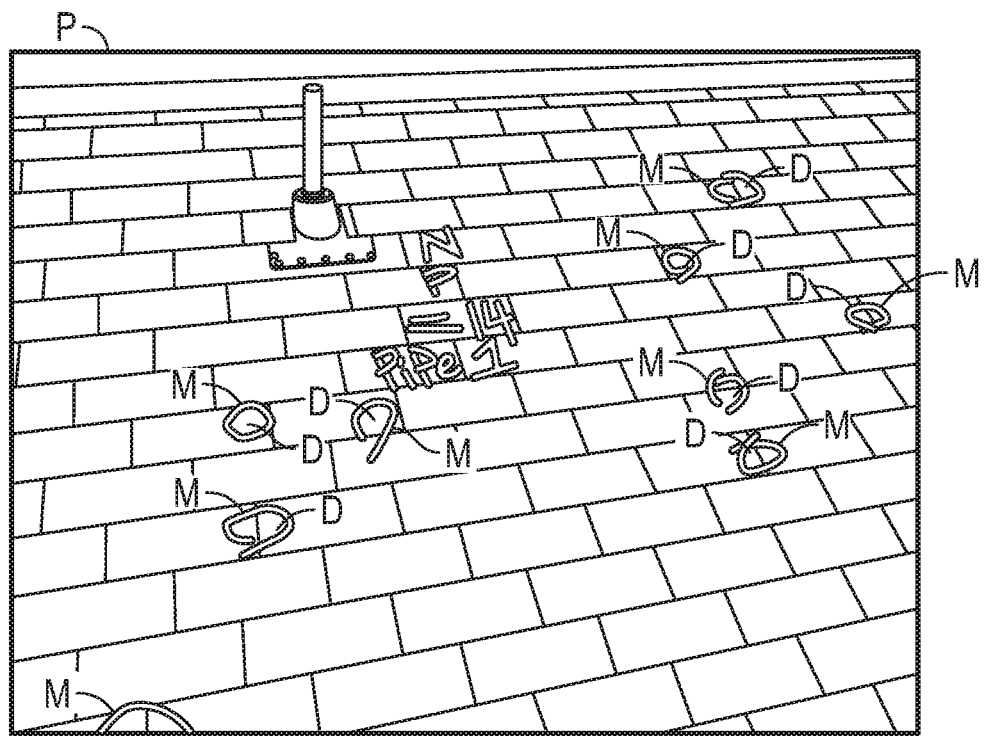
FIG. 3 is yet another exemplary prior art picture of a roof with manual markings.
Figure 4:
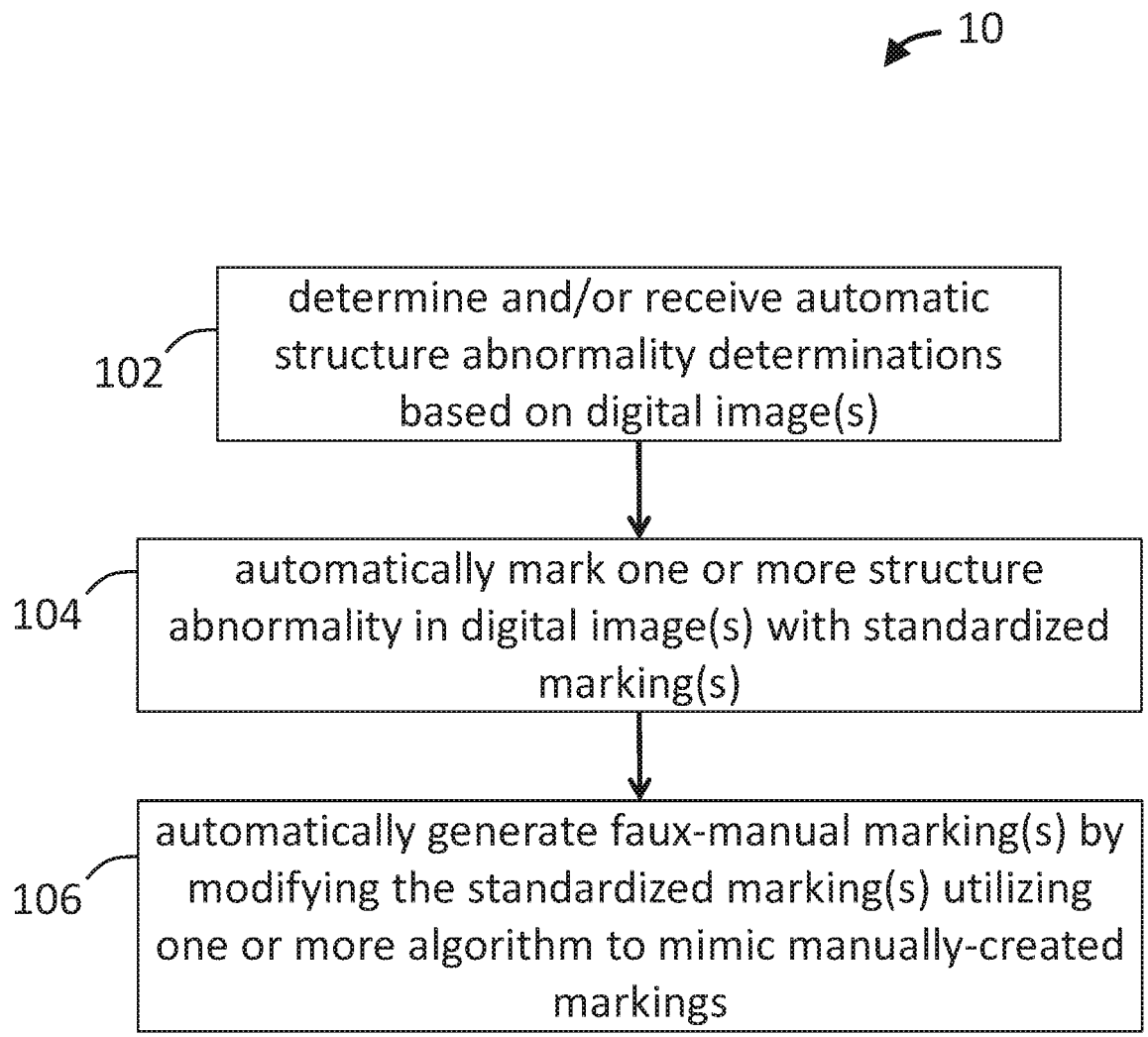
FIG. 4 is a process flow diagram of an exemplary embodiment of an automated faux-manual image-marking method in accordance with the present disclosure.

Referring now to the drawings, FIG. 3 and FIG. 4 are process flow charts depicting embodiments of computer-based faux-manual image-marking methods 10, 10a for creating the appearance (in the form of faux-manual markings 18) of manual determination and manual marking of structure abnormalities 16 on a structure 14, where in actuality the structural abnormalities 16 are determined through computer-based analysis of one or more digital images 12 of the structure 14 and the markings are computer-based faux-manual markings 18 on the digital image 12 depicting the structure 14. In one embodiment, the image-marking method 10, 10a creates machine learning outputs on the digital image 12 imitating manual inspection results. In one embodiment, the image-marking method 10, 10a utilizes, or receives, computer-based determinations of the structure abnormality 16 on a depiction of the structure 14 depicted in the digital image 12, and outputs faux-manual markings 18 on the digital image 12 to indicate information about the structure abnormalities 16, to appear as if the structure abnormalities 16 were determined by a person at the location of the structure 14 and manually marked on the structure 14 by the person before the digital image 12 was captured.

Generally, in one embodiment as shown in FIG. 4, the computer-based image-marking method 10 may comprise determining and/or receiving, with one or more computer processor 242 (FIG. 15), one or more automated determinations of structure abnormalities 16 on a structure 14 depicted in one or more digital images 12, wherein the determinations are based on image analysis of the one or more digital images 12 (step 102); automatically marking the structure abnormalities 16 in the digital image(s) 12 with standardized markings 17 with the one or more computer processor 242 (step 104); and automatically modifying, with the one or more computer processor 242, the standardized markings 17 to create faux-manual marking(s) 18 utilizing one or more computer graphics manipulation algorithm to mimic manually-created markings (step 106).

Figure 5:
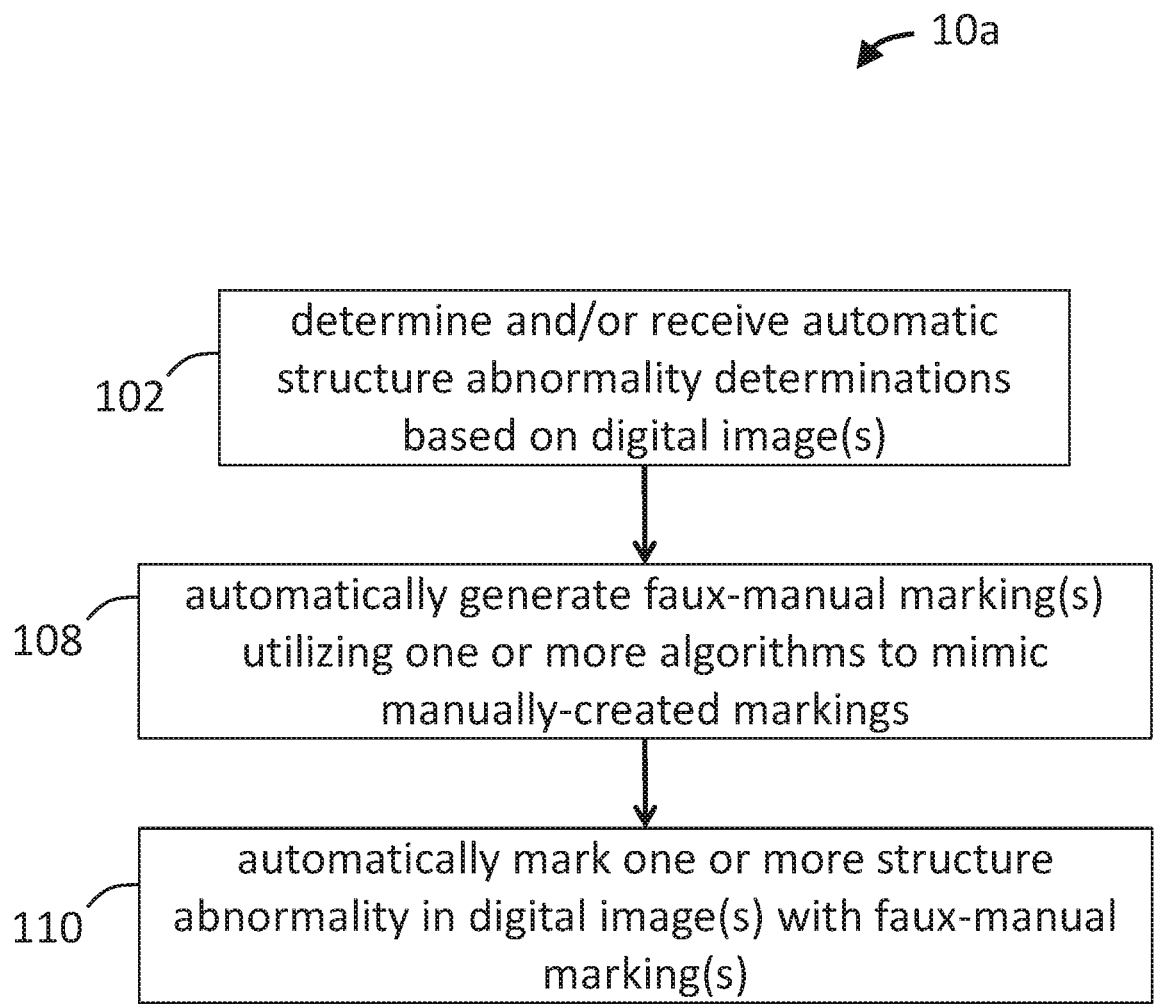
FIG. 5 is a process flow diagram of another exemplary embodiment of an automated faux-manual image-marking method in accordance with the present disclosure.

In one embodiment, as shown in FIG. 5, the computer-based image-marking method 10a may comprise determining and/or receiving, with the one or more computer processor 242, one or more automated determinations of structure abnormalities 16 on a structure 14 depicted in one or more digital images 12, wherein the determinations are based on the one or more digital images 12 (step 102); automatically generating faux-manual marking(s) 18 with the one or more computer processor 242 utilizing one or more algorithms to mimic manually-created markings (step 108); and automatically marking the structure abnormalities 16 on the one or more digital image 12 with the faux-manual markings 18, with the one or more computer processor 242, wherein the faux-manual markings 18 appear to be created manually on the structure 14 by an inspector at the physical site of the structure 14 (step 106). In some implementations, automatically generating the faux-manual markings 18 may be combined with automatically marking the structure abnormalities 16 on the one or more digital image 12 with the faux-manual markings 18.

Optionally, the method 10, 10a may comprise capturing the one or more digital images 12. The one or more digital images 12 may be captured using one or more sensors, such as cameras, which may be carried by one or more of manned aircraft, unmanned aircraft, land-based vehicles, water-based vehicles, or personnel.

The appearance of manually-created markings that mark structure abnormalities may include the sizes, shapes, thicknesses, density, color, and/or translucence and/or other characteristics of the markings; and/or a variation in the size, shape, thickness, density, color, and/or translucence, and/or other characteristics within a particular marking.

Figure 6:
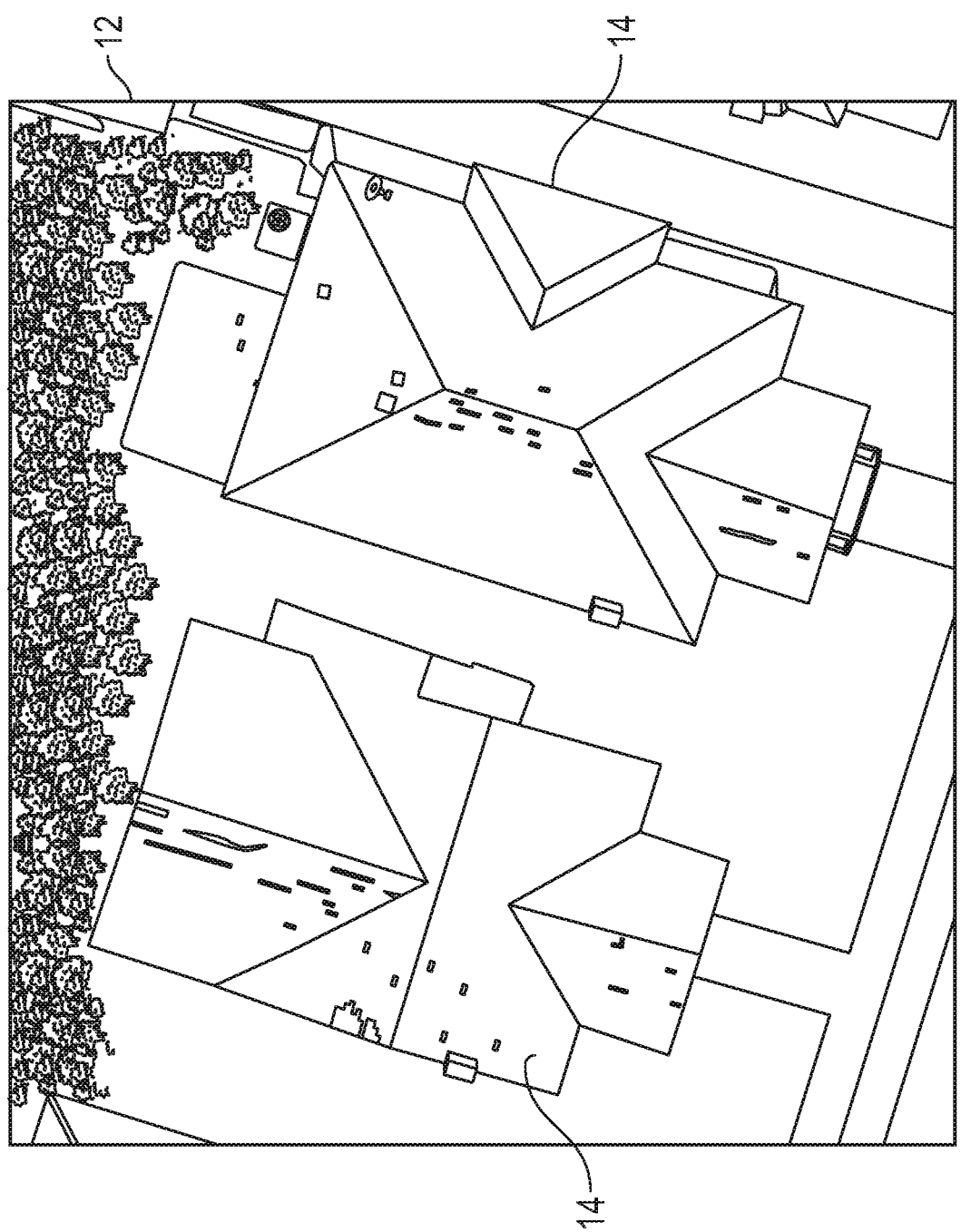
FIG. 6 is an exemplary nadir image depicting objects of interest in accordance with the present disclosure.
Figure 7:
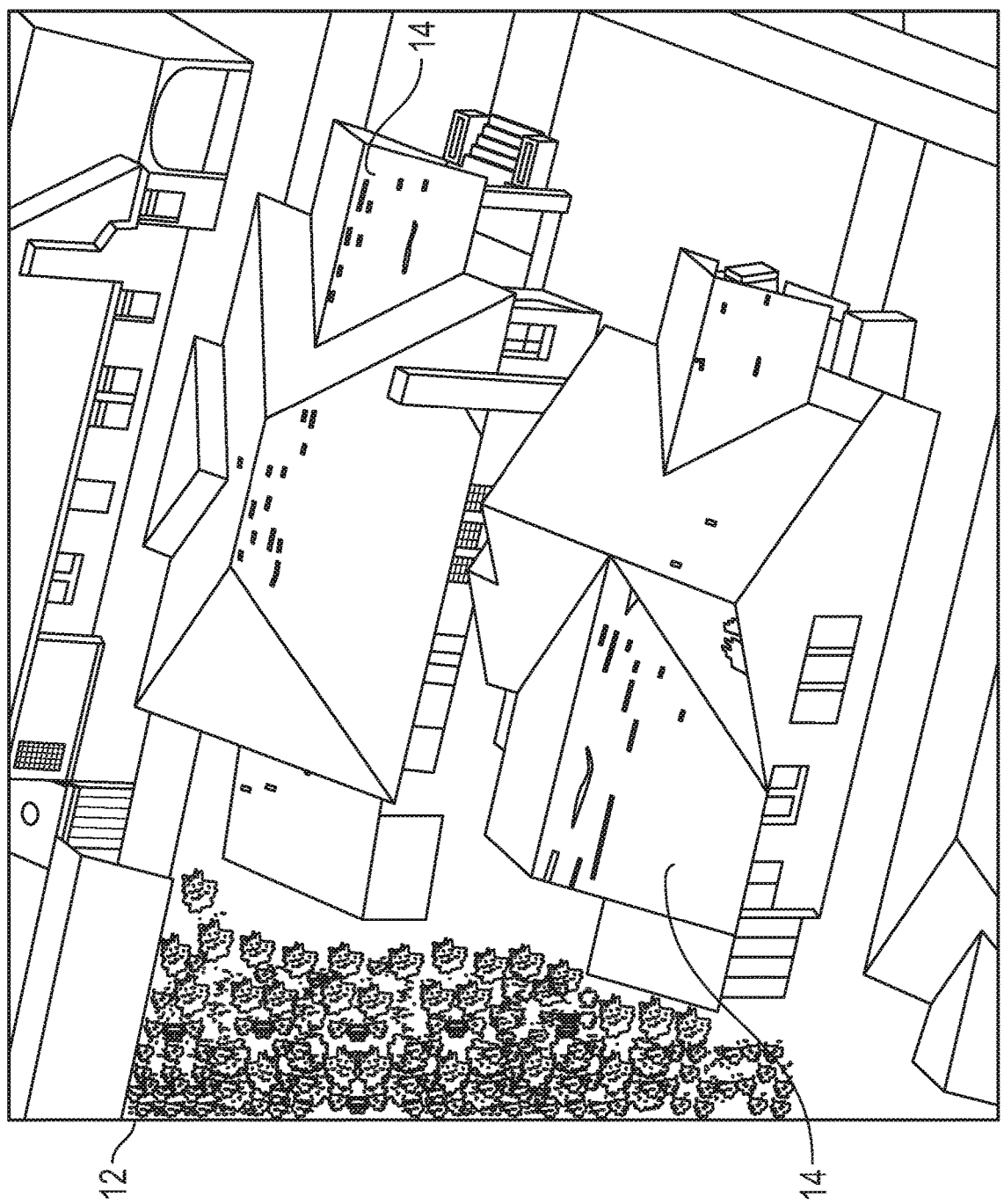
FIG. 7 is an exemplary oblique image depicting objects of interest in accordance with the present disclosure.
Figure 8:
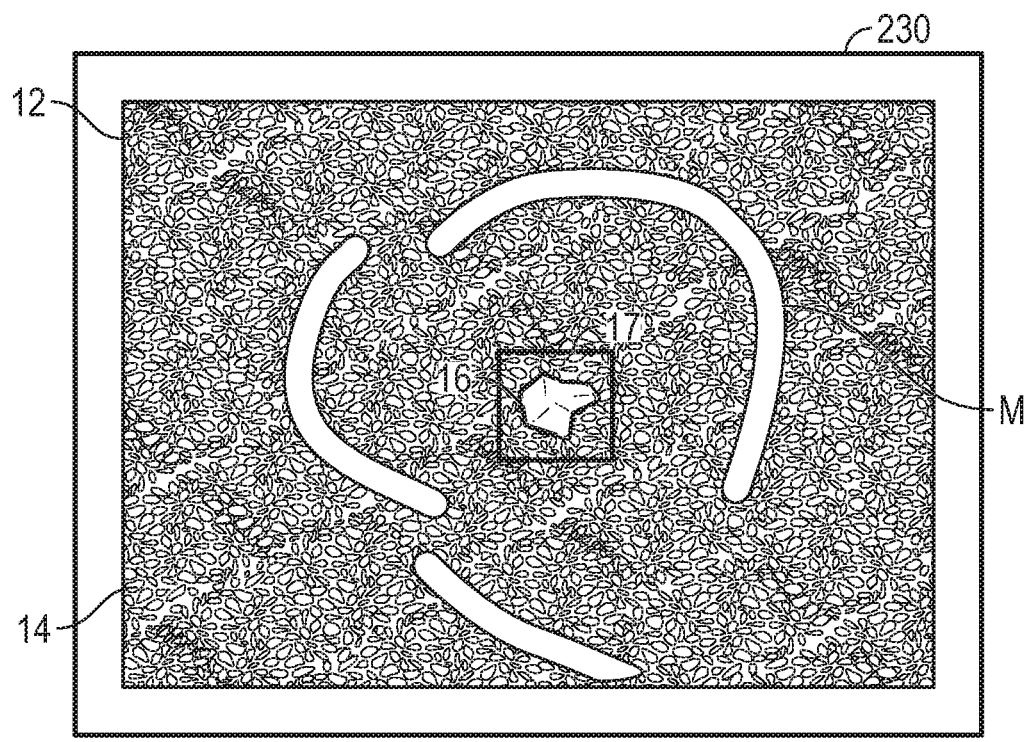
FIG. 8 is an exemplary digital image with standardized markings in accordance with the present disclosure.
Figure 9:
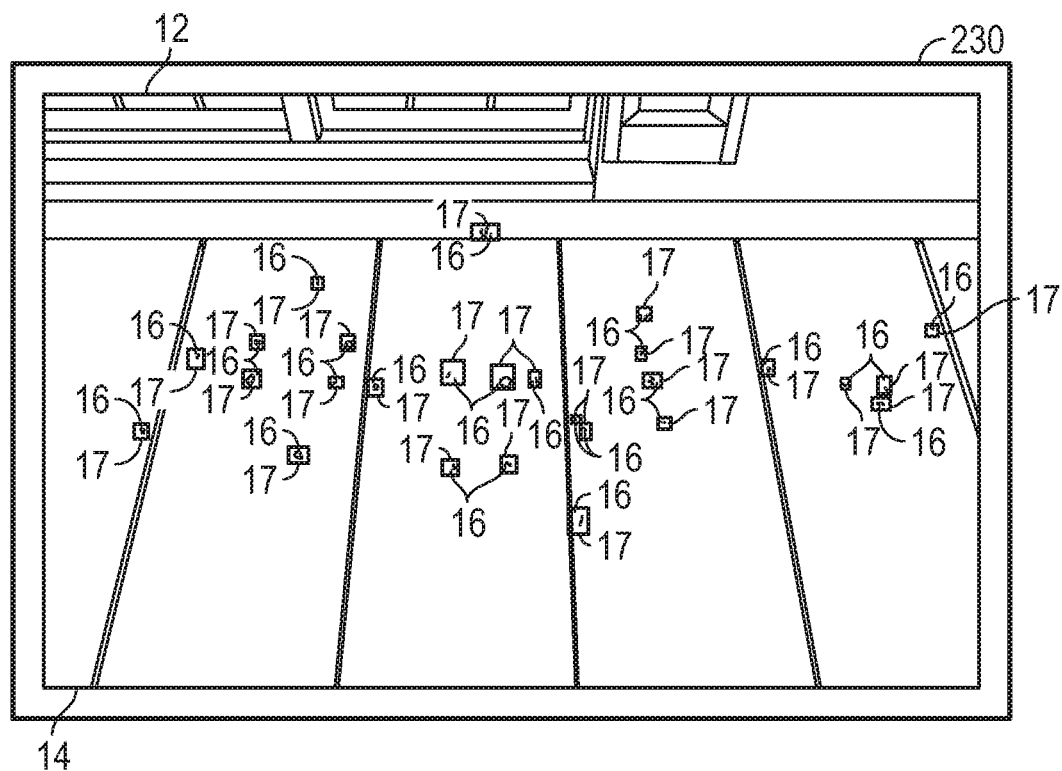
FIG. 9 is another exemplary digital image with standardized markings in accordance with the present disclosure.
Figure 10:
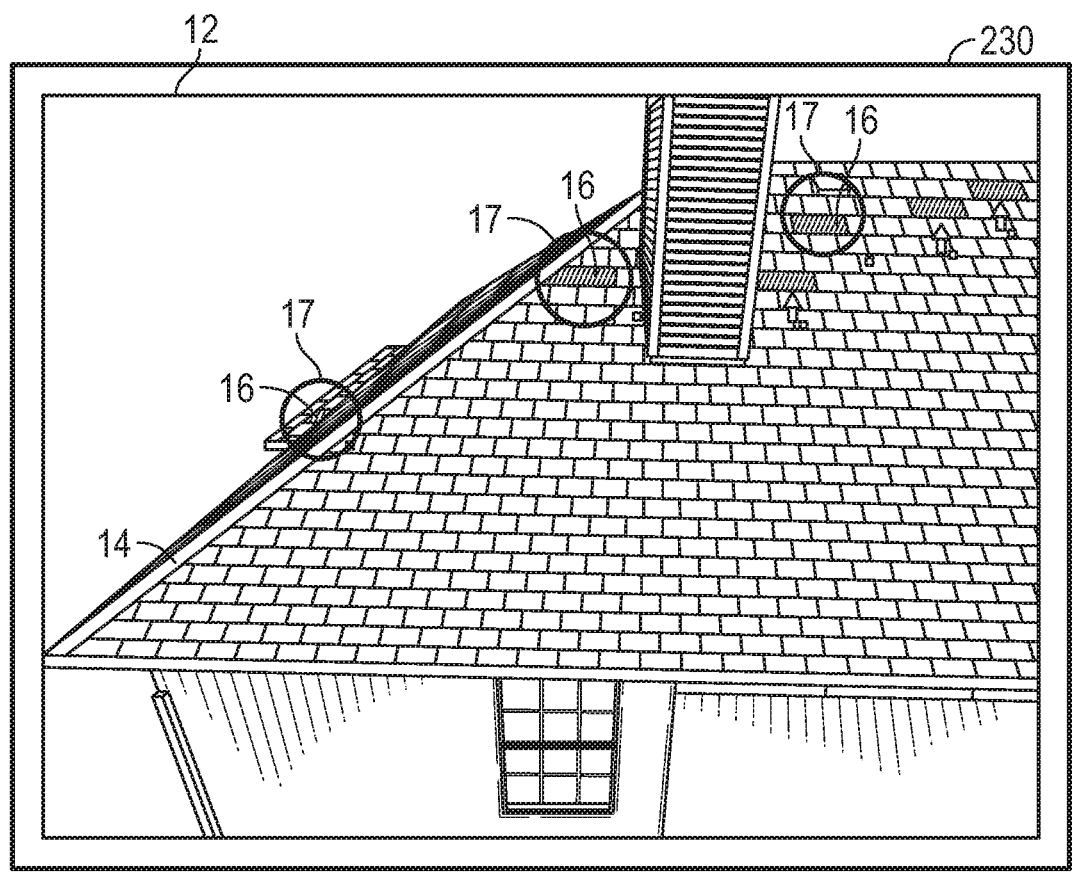
FIG. 10 is yet another exemplary digital image with standardized markings in accordance with the present disclosure.
Figure 11:
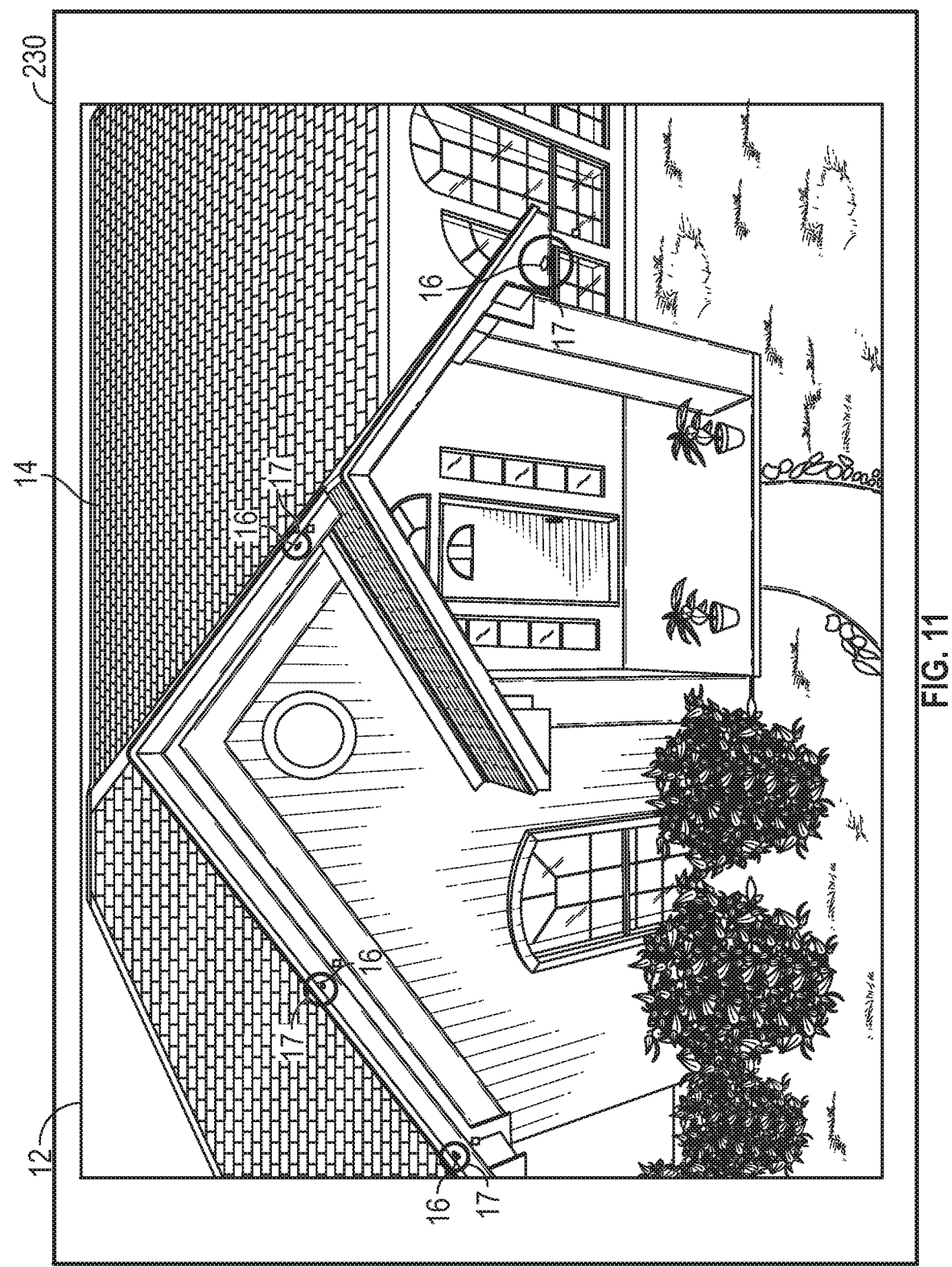
FIG. 11 is yet another exemplary digital image with standardized markings in accordance with the present disclosure.
Figure 12:
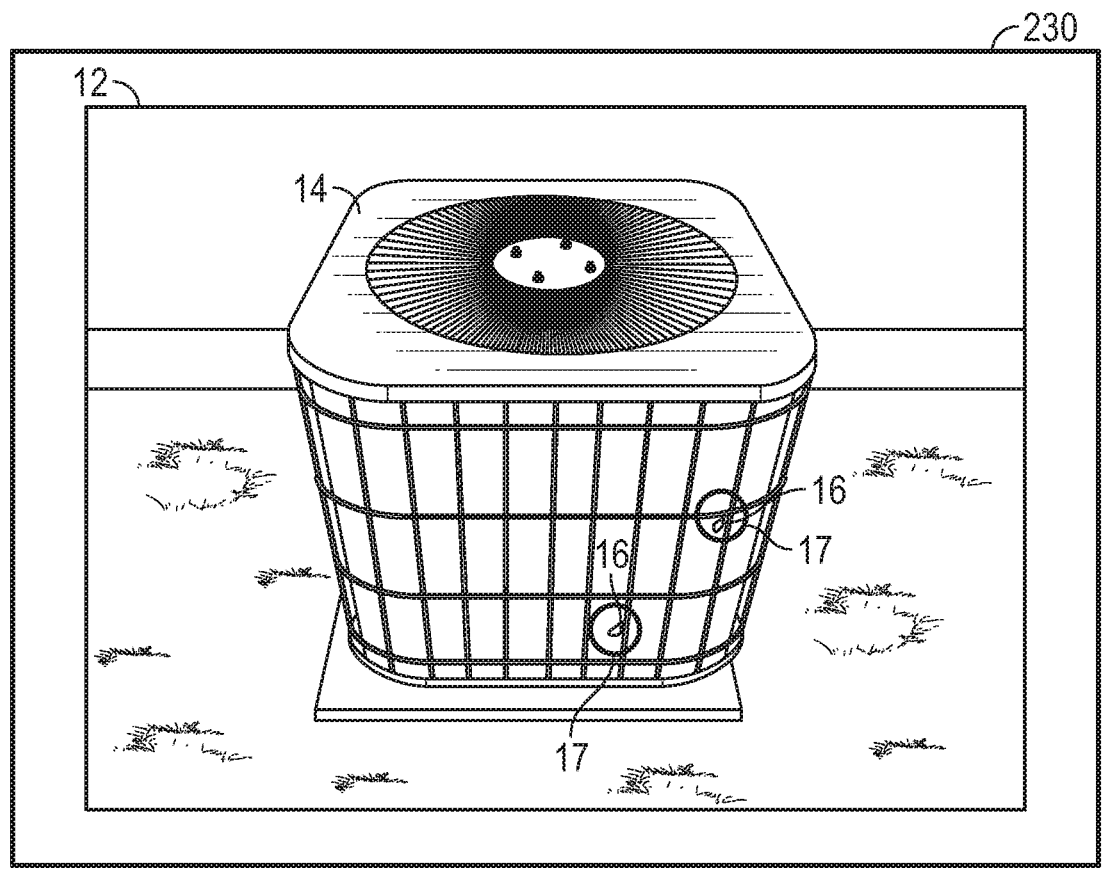
FIG. 12 is yet another exemplary digital image with standardized markings in accordance with the present disclosure.

In one embodiment, as depicted in FIG. 6 and FIG. 7, the one or more digital image 12 may be one or more picture taken of a geographic area with a sensor, such as a camera, from an overhead viewpoint, also referred to as a nadir view, typically taken directly below and/or vertically downward from the camera lens positioned above the structure 14 (FIG. 6), and/or the one or more digital image 12 may be one or more picture taken of the geographic area with a sensor, such as a camera, from an oblique viewpoint, which is an angle that is not vertically downward from a camera lens above the structure 14 (FIG. 7). In the example depicted, the structures 14 are two residential houses, however, it will be understood that the structures 14 may be of other types of objects (for example, commercial buildings, infrastructure, vehicles, natural objects, and so on).

In one embodiment, the one or more digital image 12 may be high-resolution digital images 12, such that details depicted in the digital image 12 are sharp and well defined. In one embodiment, the term high-resolution in conjunction with digital image 12 may mean the digital image 12 may have a high number of pixels per inch (for example, greater than ten pixels per inch). Many individual pixels over a small area can resolve objects in high detail (which varies with distance to the object and object type). A comparable system with fewer pixels, projected over an equivalent area, will resolve far less detail, as the resolvable information is limited by the per pixel area.

In one embodiment, the one or more digital image 12 may be captured recently, for example, within one day, two days, one week, or one month of the image analysis. In one embodiment, the one or more digital image 12 may have been captured within the preceding ninety days before the image 12 is analyzed.

In one embodiment, the sensor can be oriented and located in various orientations and locations, such as street view, satellite, automotive based, unmanned aerial vehicle based, and/or manned aerial vehicle based. Image data associated with the digital image 12 may contain nominal "visible-band" (red, green, blue) wavelength spectral data or other spectral bands data (for example, infrared wavelength spectral data).

In one embodiment, the digital image 12 may be georeferenced, such that one or more pixels have corresponding geolocation information (such as, for example, one or more of, or combinations of, latitude, longitude, elevation, Global Positioning System coordinates, and/or other geolocation coordinates) to identify the location in the real world of a pixel in the digital image 12. The geolocation of the structure abnormalities 16 may be cross-referenced to the pixel location of the structure abnormalities 16 on the structure 14 depicted in the digital image 12. See, for example, U.S. Pat. No. 7,424,133 that describes techniques for geolocating oblique images and measuring within the oblique images; also, see U.S. Patent Publication No. 2015/0347872 describing object detection from aerial images using disparity mapping and segmentation techniques, the entire contents of both of which are hereby incorporated herein by reference. Additionally, or alternatively, techniques known in the art as "bundle adjustment" can also be used to create and/or enhance the geolocation data.

The geolocation data can be stored as metadata within the images, or stored separately from the images and related to the images using any suitable technique, such as unique identifiers.

The digital images 12 may be described as pixelated numbers in a three-dimensional (3D) array of electronic signals. The array may comprise spatial (for example, x, y or latitude, longitude) and spectral (for example, red, green, blue) elements. Each pixel in the digital image 12 captures wavelengths of light incident on it, limited by spectral bandpass. The wavelengths of light may be converted into digital signals readable by a computer as float or integer values. How much signal exists per pixel depends, for example, on the lighting conditions (light reflection or scattering), what is being imaged, and/or the imaged object's chemical properties. The electronic signal captured per pixel, and converted into a float or integer array of numbers read by a computer, may be aggregated over a group of pixels and combined in any spatial or spectral dimension. The electronic signals per pixel can be evaluated individually or aggregated into clusters of surrounding pixels.

In one embodiment, the step 102 of automatically determining and/or receiving automatically the determinations of the structure abnormalities 16 based on the digital image(s) 12 may comprise automatically determining, with the one or more computer processor 242, the structure abnormalities 16 based on assessing the pixels of the digital image 12 with a machine learning classifier and/or artificial intelligence and/or other algorithm(s) for imagery-based analysis, such as a neural net image classification system, and/or a convolutional neural network (CNN).

The determination of information regarding the structure abnormalities 16 on one or more structure 14 depicted in one or more digital images 12 of step 102 in the computer-based image-marking method 10, 10a, is based on computer analysis of the one or more digital images 12. In one embodiment, the determination of information regarding the structure abnormalities 16 is generated using machine learning, artificial intelligence, and/or combinations of the same. The determination of information may include the determination of the presence, absence of, type of, severity of, location of, size of, and/or other characteristics of or lack of characteristic of, one or more structure abnormality 16 on the structure(s) 14 depicted in the one or more digital image 12. The determinations of structure abnormalities 16 may include one or more of the following: location of the structure abnormalities 16 in the digital image 12 (for example, pixel location), geolocation of the structure abnormalities 16, type of structure abnormalities 16, time and/or date of the determination, location on the structure 14 of the structure abnormalities 16 in relation to other elements of the structure 14, and/or combinations of any of the preceding.

In one embodiment, determinations of information regarding the structure abnormalities 16 on the structure(s) 14 depicted in one or more digital images 12 may be generated with the one or more computer processor 242 with an object characteristic estimation method comprising subdividing one or more digital image 12 depicting one or more object of interest (such as structure 14) into segments; assessing, automatically, the contents depicted in one or more of the segments using General Image Classification; and determining, automatically, the level of confidence that the one or more of the segments have one or more predetermined characteristics, such as one of a plurality of predetermined characteristics each having different extent and/or severity of the characteristic of type of characteristic. The predicted results may then be spatially re-joined after processing to generate a map of predictions with confidence scores indicative of how statistically likely the prediction is true. In one embodiment, the determinations are generated using the system and methods described in U.S. Patent Publication No. 2019/0065907, entitled "Systems and Methods for Automatic Estimation of Object Characteristics from Digital Images", which is hereby incorporated herein by reference in its entirety.

In one embodiment, determinations of the structure abnormalities 16 on the structure(s) 14 depicted in one or more digital images 12 may be generated utilizing one or more of a neural network (NN), deep neural network (DNN), Convolutional neural networks (CNN), fully convolutional neural network (FCN), generative adversarial network (GAN), or other machine learning and/or artificial intelligence techniques in the analysis of the digital image(s) 12. In one embodiment, one or more steps of the generating the determinations of structure abnormalities 16 on a structure 14 depicted in one or more digital images 12 may be manual. In one embodiment, all of the steps of the generating the determinations of structure abnormalities 16 on a structure 14 depicted in one or more digital images 12 may be automated, without manual intervention.

For machine learning purposes, characteristics of the structure 14 in a digital image 12, requiring classification or labelling, may be pre-defined as training examples. In some implementations, a human may initially define what set of digital images 12 best represent the characteristics of the structure 14 as training examples. These digital images 12 may be ingested into a convolutional neural network (CNN), for example, and statistical iterations, and through clustering the pixel data, result in establishing correlations, that are associated with the pre-defined characteristics of the structure 14.

CNN are deep learning (machine learning) models that may be used to perform functions through the interconnection of equations that aggregate the pixel numbers using specific combinations of connecting the equations and clustering pixels. The learned patterns may then be applied with the one or more computer processors 242 to new digital images 12 to assess whether the learned features of the structures 14 are present or not in the new digital images 12. The result of the analysis may be a level of confidence that the digital image 12 depicts a particular predetermined structure abnormality 16 (for example, hail damage, wind damage, wear, and so on).

In one embodiment, the step 102 of automatically determining or automatically receiving the determinations of structure abnormalities 16 based on the digital image(s) 12 may comprise creating, with the one or more computer processors 242, a classifier or model predictive of the type, severity, and/or extent of damage to the object of structure 14 based on previously reviewed examples of objects with damage of varying type, severity, and/or extent. The machine learning algorithms, which may include neural networks or artificial intelligences, may develop correlations based on image spectral information, texture information, and other contextual details through the supply of representative data (for example, example digital images 12 of damaged structures 14 having structure abnormalities 16). These correlations may be stored as a model that may then be applied to the digital images 12 by the one or more computer processors 242.

In one embodiment, algorithms comprising a neural network may be utilized by the one or more computer processors 242 to determine patterns within the digital image 12 of the structure 14, and the predictive model may be constructed therefrom. The one or more computer processors 242 may establish correlations across spectral, spatial, and/or contextual space for the digital image 12 of the structure 14. A set of representative data that contains other structures 14 with the predetermined types/severity of the structure abnormality 16 may be identified and submitted to the machine learning classification as "training" material. Training entails a statistical method to iterate the application of the correlations or model, "learned" from the training data to the test data set. The accuracy of the prediction based on the known labels can be provided per iteration until a desired accuracy is achieved (nominally, >85%, but adjustable, for example, depending on the information provided or the desired accuracy of the user) or timeframe is met. The final model post-iteration may then be applied to a broader, unlabeled or unconstrained, region, by the one or more computer processors 242.

In one embodiment, the one or more computer processors 242 may utilize deep learning convolutional neural networks to classify digital images 12 of structures 14 having predetermined structure abnormalities 16 to construct the predictive model. Non-exclusive examples of a predictive model include a Support Vector Machine (svm) or k-means model, such as those described in the article "Support vector machines in remote sensing: A review," (Mountrakis et al., ISPRS Journal of Photogrammetry and Remote Sensing Volume 66, Issue 3, May 2011, pages 247-259), which is hereby incorporated by reference in its entirety herein.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest.

The one or more computer processors 242 may utilize the machine learning classifier (or other model) to output the probability that the structure 14 in the digital image 12 has structure abnormalities 16 and/or at what level the structure 14 has the structure abnormality 16. The basic convolutional neural network may have been or be trained with information to classify the predetermined structure abnormality 16 of the structure 14. For example, the CNN may classify one or more of the structure abnormalities 16 including a scale of extent and/or severity. For example, when assessing a digital image 12 of the structure 14 with a roof having the structure abnormalities 16 of wind damage, the model may determine there is a 95% level of confidence that the structure 14 has wind damage and that the damage is at an 80% level on a scale of damage severity/extent. As another non-exclusive example, the model may determine there is an 85% level of confidence that the structure 14 has wind damage at a 60% level on a scale of damage severity/extent.

In one embodiment, an object detector deep learning algorithm (for example, single shot detection, also known as SSD), that can determine more precise, localized information within the digital image 12, may be used, or may have been used, by the one or more computer processors 242 to determine structure abnormalities 16. Object detector deep learning algorithms are described, for example, in the article "SSD: Single Shot MultiBox Detector" by Liu et al. (Computer Vision—ECCV 2016, Lecture Notes in Computer Science, vol. 9905), which is hereby incorporated by reference in its entirety herein. The subsequent increased granularity provided by of the object detector deep learning algorithm enables clear articulation and identification of precise location of the detected characteristics (such as abnormalities or objects) within the digital image 12. The combination and fusion of multiple deep learning techniques is less computationally intensive than other methods, but still provides results accurate enough for identification of characteristics within the image 12, for example, structure abnormalities 16 (such as damage) or objects.

In one embodiment, in step 104 of the computer-based image-marking method 10, as illustrated in FIGS. 8-12, the one or more computer processor 242 may automatically mark the one or more structure abnormality 16 in the digital image(s) 12 with the standardized marking(s) 17, as a result of the determination of the structure abnormalities 16 in the digital image(s) 12.

In one embodiment of the computer-based image-marking method 10, 10a, the structure abnormalities 16 may be systematically detected within the digital image(s) 12 by the one or more computer processors 242 with the conventional Neural Network approach described previously.

Once detected, the one or more computer processors 242 may automatically indicate the structure abnormalities 16 on the digital image(s) 12. For example, the one or more computer processors 242 may create and/or automatically overlay the standardized markings 17 on the digital image(s) 12, and/or incorporate the standardized markings 17 into the digital image(s) 12, over and/or around the structure abnormalities 16, or otherwise mark the digital image(s) 12 as indicative of the location, shape, and/or size of the structure abnormalities 16.

The standardized markings 17, also referred to as standardized bounding markings, may be one or more polygons having a predetermined size and/or shape. For example, the standardized marking 17 may be a simple rectangle box, closed circle outline, or closed oval outline surrounding the structure abnormality 16.

The standardized markings 17 may be computer graphics overlays that have precise angles or curves (for example, precise angles in the polygons, precisely round circles, uniform shapes, uniform colors, and so on). The standardized markings 17 may be standard polygons. The standardized markings 17 may be created as a bounding box as a layer added on top of the digital image 12 by the one or more computer processors 242.

The digital images 12 may be raster objects. The standardized markings 17 are typically vector objects. The standardized markings 17 may be raster objects if the standardized marking 17 is "drawn" in pixel space by the one or more computer processors 242 (for example, the standardized markings 17 may be burned into the pixels of the digital image 12) versus created in pixel-coordinate space (that is, when the standardized markings 17 are layered as a region defined by a certain numerical array associated with specific pixels in the digital image 12) by the one or more computer processors 242.

Generally, vector objects are made up of lines and curves defined by mathematical objects called vectors, which describe a component according to its geometric characteristics. Raster objects use a rectangular grid of picture elements (pixels) to represent components, wherein pixels are assigned corresponding specific pixel locations and color values.

In one embodiment, in step 106, the standardized markings 17 may be automatically modified by the one or more computer processors 242 using computer graphic-manipulation algorithms such as object detection and localization algorithms, in order to generate the faux-manual markings 18 to represent the standardized marking 17 in a more organic, human-drawn-type implementation. Computer graphic-manipulation algorithms may include those algorithms that can be utilized to generate or change digital graphical computer displays. For example, the standardized markings 17 may be modified by the one or more computer processors 242 to generate the faux-manual markings 18 using a randomized geometry-based function or a parametric function. In one embodiment, the standardized markings 17 may be modified by the one or more computer processors 242 using a Bézier curve combined with a randomized ellipse drawer. A person having ordinary skill in the art will understand the use of Bézier curves (based on the Bernstein polynomials) in graphical manipulation.

Figure 13:
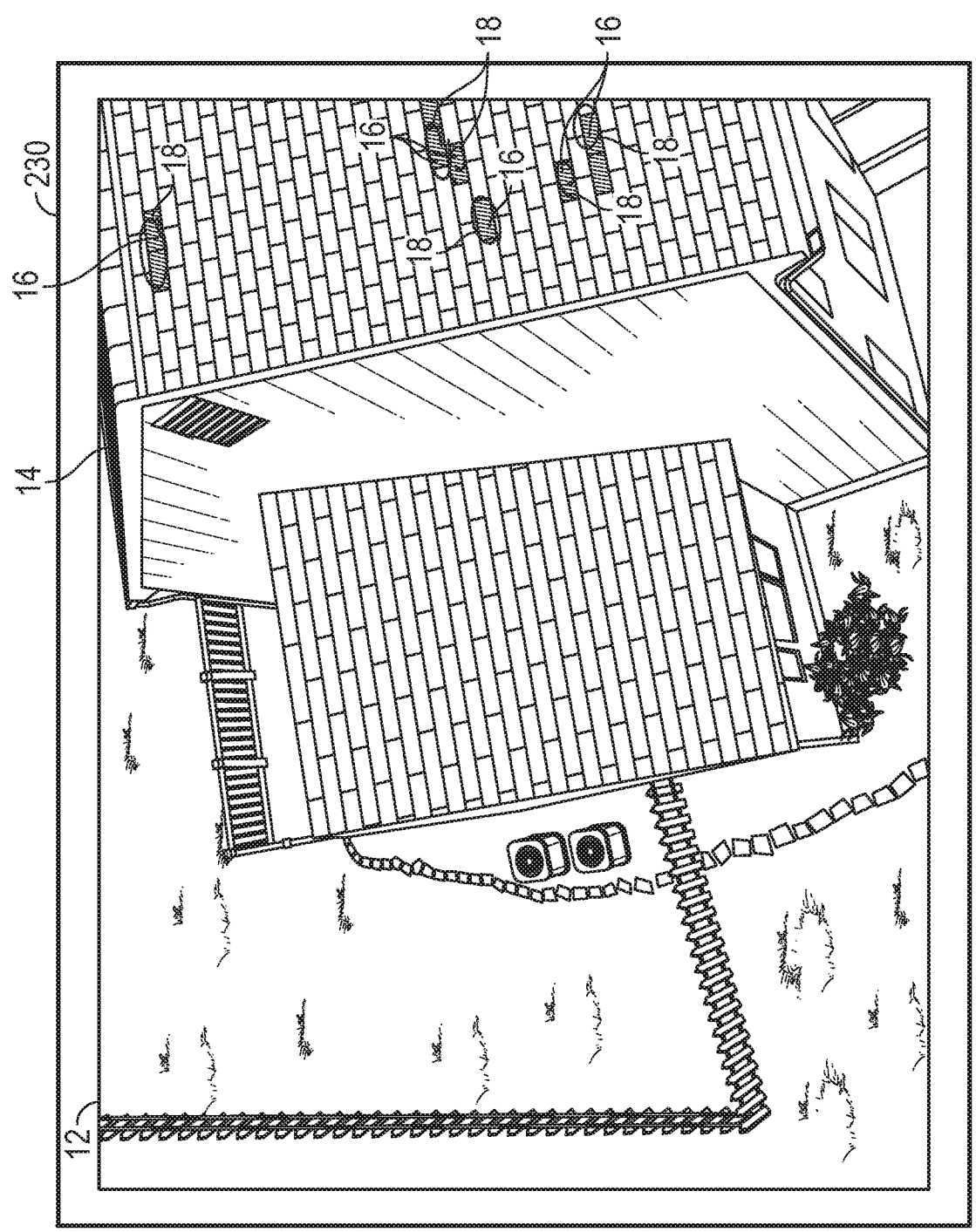
FIG. 13 is an exemplary display on a screen in accordance with the present disclosure.
Figure 14:
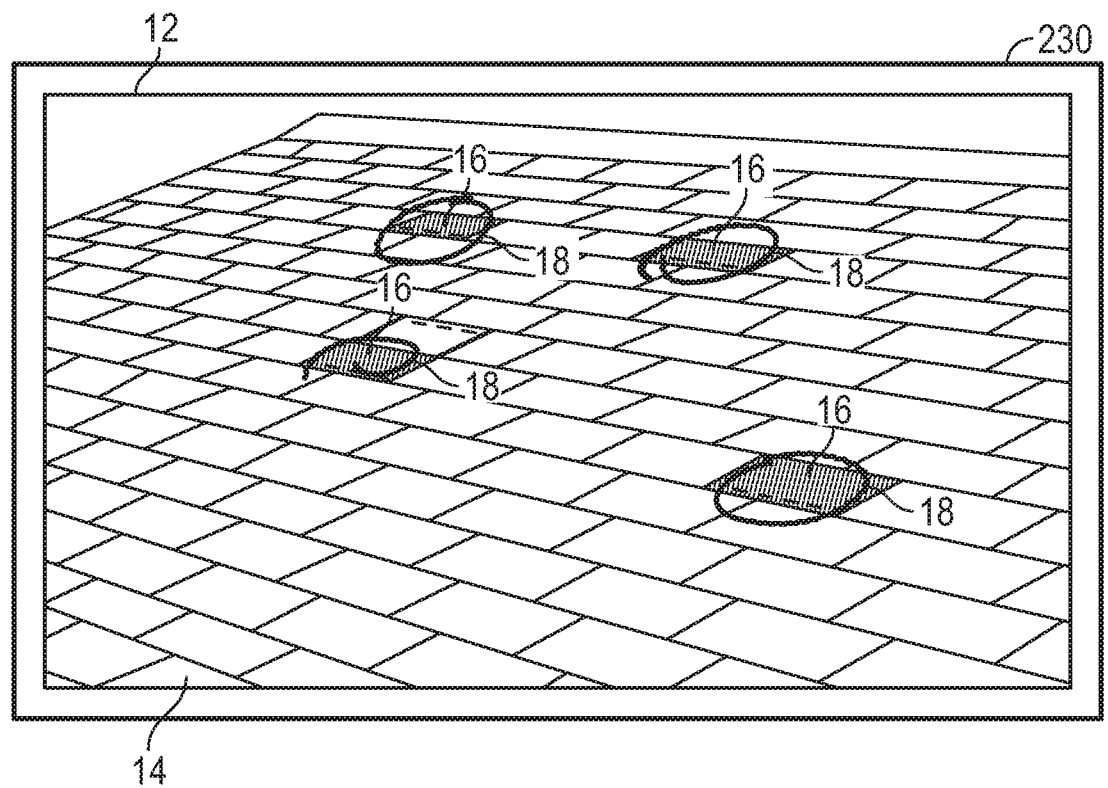
FIG. 14 is another exemplary display on a screen in accordance with the present disclosure.

Referring now to FIGS. 13 and 14, in one embodiment, the one or more computer processor 242 may automatically generate the faux-manual markings 18 (directly, as in step 108, and/or by modifying the standardized markings 17, as in step 106) and/or mark the structure abnormalities 16 on the one or more digital image 12 with the faux-manual markings 18 (as in steps 104 and 110) based on one or more algorithms, machine learning, and/or artificial intelligence to cause the faux-manual markings 18 on the digital image 12 depicting the structure 14 to mimic markings that would have been made on the actual structure 14 in the real world by a person. In one embodiment, the image-marking method 10, 10a may receive and/or create surface level 3D data (such as, for example, a voxel map), and the one or more computer processors 242 may cause the faux-manual markings 18 to follow the 3D surface on which it is "drawn" or layered, rather than being placed on a planar 2D surface. Following the 3D surface with the faux-manual markings 18 may result in a more realistic looking marking on the structure 14.

The faux-manual markings 18 are typically vector objects. The faux-manual markings 18 may be raster objects if the faux-manual markings 18 are "drawn" in pixel space by the one or more computer processors 242 (for example, the faux-manual markings 18 may be burned into the pixels of the digital image 12) versus created in pixel-coordinate space by the one or more computer processors 242 (that is, when the faux-manual markings 18 are layered as a region defined by a certain numerical array associated with specific pixels in the digital image 12) by the one or more computer processors 242.

In one embodiment, the image-marking method 10, 10a may cause the one or more computer processors 242 to use one or more algorithm to generate the faux-manual markings 18 such as a randomized geometry-based function or a parametric function such as Bézier curve. A person having ordinary skill in the art will understand the use of Bézier curves (based on the Bernstein polynomials) in graphical manipulation.

In one embodiment, the image-marking method 10, 10a automatically generates the faux-manual markings 18 and/or marks the structure abnormalities 16 on the one or more digital image 12 with the faux-manual markings 18 with the one or more computer processors 242 utilizing geometric algorithms that generate faux-manual markings 18 that emulate human-made marking strokes or application on the surface of the structure 14. For example, the faux-manual markings 18 may emulate paintbrush strokes, chalk strokes, spray paint application, roller paint strokes, ink strokes, and so on.

In one embodiment, the image-marking method 10, 10a may cause the one or more computer processors 242 to use one or more algorithm to generate faux-manual markings 18 such that the faux-manual markings 18 have random sizes, shapes, thicknesses, and/or other random characteristics. For example, the image-marking method 10, 10a may cause the one or more computer processors 242 to use one or more randomization algorithm to generate faux-manual markings 18 that have random sizes, shapes, thicknesses, density, translucence, color, and/or other random characteristics. In one embodiment, the image-marking method 10, 10a may cause the one or more computer processors 242 to generate the faux-manual markings 18 such that the faux-manual markings 18 have one or more variation in the sizes, shapes, thicknesses, density, translucence, density, translucence, color, and/or other characteristic of the faux-manual markings 18. The variation may be produced within a particular faux-manual marking 18 or between multiple faux-manual markings 18.

In one embodiment, the image-marking method 10, 10a may cause the one or more computer processors 242 to generate the faux-manual markings 18 such that the faux-manual markings 18 are one or more color. In one embodiment, the color of the faux-manual markings 18 may indicate a confidence interval of the determination of the structure abnormality 16, such as the confidence intervals produced as outputs of machine-learning. For example, for determinations of structure anomalies 16 with a high confidence interval, the faux-manual markings 18 may be red; for determinations of structure anomalies 16 with a medium confidence interval, the faux-manual markings 18 may be yellow; and for determinations of structure anomalies 16 with a low confidence interval, the faux-manual markings 18 may be white. High confidence interval, medium confidence interval, and low confidence interval, may be pre-determined ranges that indicate a percentage of certainty that the determination of structure abnormality 16 is correct. For purposes of this disclosure, the term "level of confidence" may mean the statistical likelihood that a condition is true and the term "confidence score" may be a numerical value indicative of the level of confidence.

In one embodiment, the image-marking method 10, 10a may cause the one or more computer processors 242 to generate the faux-manual markings 18 such that the faux-manual markings 18 indicate different levels of the extent or severity of the structure abnormality 16. For instance, color may be used to indicate levels of extent or severity of the structure abnormality 16. For example, for a structure abnormality 16 that is hail damage with a ninety percent level of severity on a predetermined scale of severity, the faux-manual marking 18 may be red; for a structure abnormality 16 that is hail damage with an eighty percent level of severity on a predetermined scale of severity, the faux-manual marking 18 may be orange; for a structure abnormality 16 that is hail damage with a seventy percent level of severity on a predetermined scale of severity, the faux-manual marking 18 may be yellow, and so on.

In one embodiment, the image-marking method 10, 10a may cause the one or more computer processors 242 to generate the faux-manual markings 18 that circle, encompass, partially circle, and/or partially encompass the structure abnormality 16 on the structure 14 depicted in the digital image 12. For example, one or more of the faux-manual markings 18 may be a circle, a polygon, or a line. One or more of the faux-manual markings 18 may be a closed circle or polygon, or an open (i.e., partial) circle or polygon, a loop, a cardioid, or a spiral. The amount of gap in the open circle or the open polygon of the faux-manual markings 18 may vary within a pre-determined range. An overlap and/or a location of line intersections of the faux-manual markings 18 may vary within a pre-determined range.

In one embodiment, the image-marking method 10, 10a may cause the one or more computer processors 242 to generate the faux-manual markings 18 such that the faux-manual markings 18 may vary in size in comparison to other faux-manual markings 18. For example, the faux-manual markings 18 may vary in size along one or both of the x axis and the y axis of the digital image 12. The ranges for variation in x and y may be preprogrammed. The values of the size of the faux-manual markings 18 in one or both of the x and y axes of the digital image 12 may be programmed to vary from faux-manual marking 18 to faux-manual marking 18 within a plurality of faux-manual markings 18 at one or more of predefined rates, programmatically, or randomly within a range.

In one embodiment, the image-marking method 10, 10a may cause the one or more computer processors 242 to generate the faux-manual markings 18 such that the faux-manual markings 18 have a thickness and length, and in which the thickness of the faux-manual marking 18 varies along the length of the faux-manual marking 18. The thickness, and the location on the length the thickness changes, may be preprogrammed and may have a predetermined level of variability.

In one embodiment, the image-marking method 10, 10a may cause the one or more computer processors 242 to generate the faux-manual markings 18 such that the faux-manual markings 18 appear to be located on the same plane as a surface of the structure 14 photographed for the digital image 12. For surface irregularities, the faux-manual markings 18 may "skip" (that is, automatically be moved) to the nearest planar surface of the structure 14 in the digital image 12 along a predetermined path.

Though the method 10, 10a has been described in the context of determining and/or marking abnormalities, such as damage, on the structure 14, it will be understood that the method 10 is equally applicable to determining and/or marking other characteristics of the structure 14, including but not limited to condition, wear, components, features, and form, and/or may include the negative state (that is, that the object characteristic is not present).

As shown in FIG. 13 and FIG. 14, in one embodiment, the display of the faux-manual markings 18 of the abnormalities 16 on the one or more digital image 12 may be digitally shown on one or more screens 230. Non-exclusive examples of screens 230 include those found with user devices 252 such as computer monitors, laptop computers, smart phones, projector systems, computer tablets, and other electronic and/or optical devices.

In one embodiment, the one or more computer processors 242 may generate one or more report including the one or more digital image 12 depicting the one or more portions of the structure 14 showing the structure abnormalities 16 and the faux-manual markings 18 indicating the abnormalities 16. The report may be digital and/or printed.

Figure 15:
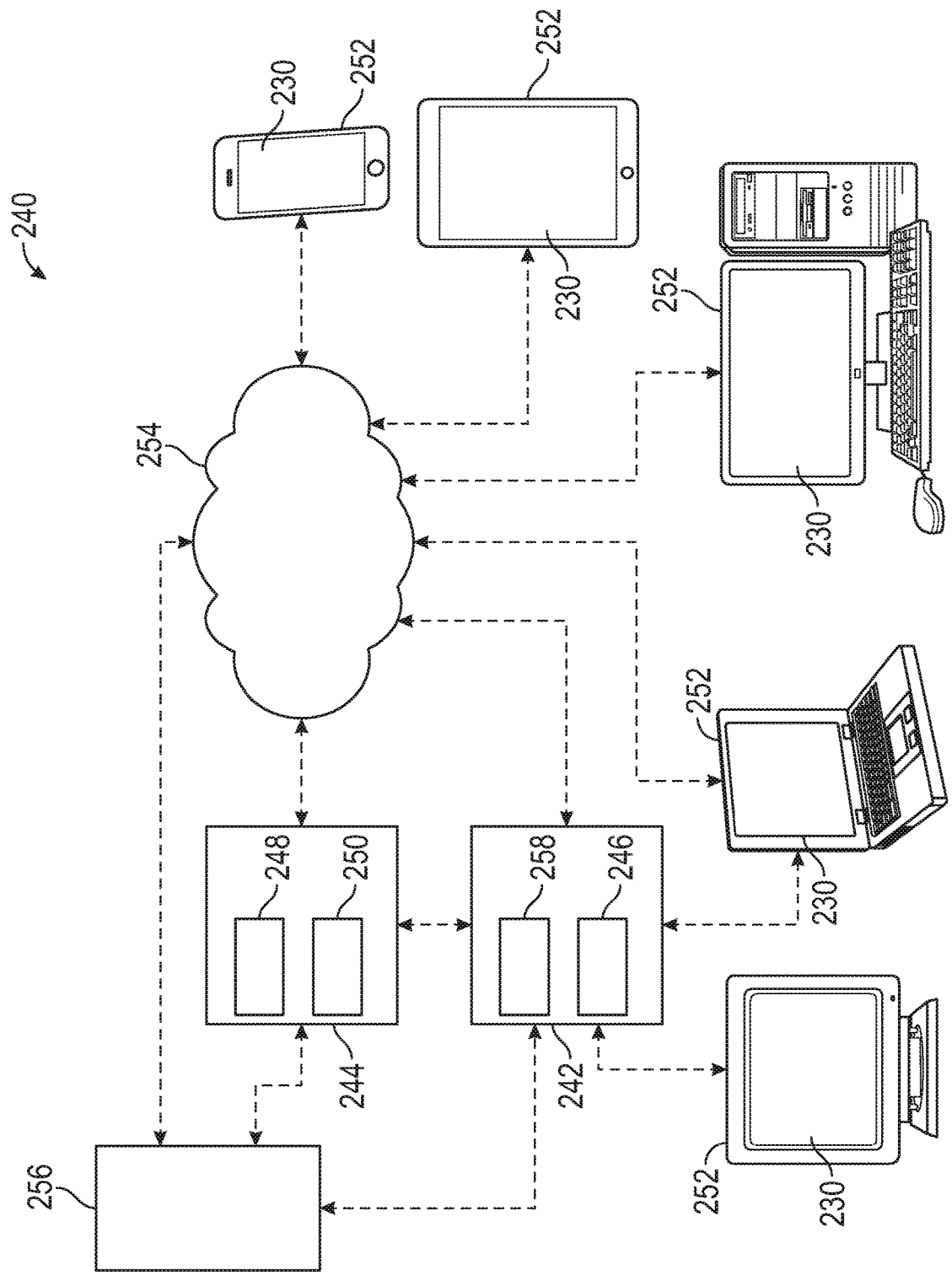
FIG. 15 is a schematic of an exemplary computer system in accordance with the present disclosure.

In one embodiment, as shown in FIG. 15, the faux-manual image-marking method 10 may be carried out on one or more computer system 240. The computer system 240 may comprise one or more computer processor 242, one or more non-transitory memory 244, and one or more communication component 246. The non-transitory memory 244 may store one or more database 248 and program logic 250. The one or more database may comprise the digital images 12 and/or other data; though it will be understood that the digital images 12 may be provided from outside sources and/or stored elsewhere. The computer system 240 may bi-directionally communicate with a plurality of user devices 252 and/or may communicate via a network 254. The computer processor 242 or multiple computer processors 242 may or may not necessarily be located in a single physical location.

In one embodiment, a non-transitory computer-readable storage medium 258 stores program logic, for example, a set of instructions capable of being executed by the one or more computer processor 242, that when executed by the one or more computer processor 242 causes the one or more computer processor 242 to carry out the image-marking method 10, 10a.

In one embodiment, the network 254 is the Internet and the user devices 252 interface with the system via the communication component and a series of web pages. It should be noted, however, that the network 254 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, an Ethernet network, combinations thereof, and/or the like. It is conceivable that in the near future, embodiments of the present disclosure may use more advanced networking topologies.

In one embodiment, the computer system 240 comprises a server system 256 having multiple servers in a configuration suitable to provide a commercial computer-based business system such as a commercial web-site and/or data center.

From the above description and examples, it is clear that the inventive concepts disclosed and claimed herein are well adapted to attain the advantages mentioned herein. The results of the faux-manual image-marking method 10, 10a may be used for a wide variety of real-world applications. Non-exclusive examples of such applications include use of the results to provide and/or complete inspections, to evaluate condition, to repair the structures 14, to create underwriting, to insure, to purchase, to construct, to value, or to otherwise impact the use of or the structure 14 itself.

For exemplary purposes, examples of digital images 12 of residential structures with roof damage have been used. However, it is to be understood that the example is for illustrative purposes only and is not to be construed as limiting the scope of the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

It is to be understood that the steps disclosed herein may be performed simultaneously or in any desired order. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

What is claimed is:

1. A computer system storing computer readable instructions that, when executed by the computer system, cause the computer system to perform the following:
obtain results of an automated analysis of one or more digital images indicative of determinations of structure abnormalities of one or more portions of a structure depicted in the one or more digital images;
apply, automatically, on the one or more digital images, standardized markings indicative of at least a location in the digital image of the structure abnormalities of the structure depicted in the digital image; and
generate, automatically, one or more faux-manual markings on the digital image by modifying one or more of the standardized markings, utilizing one or more image-manipulation algorithm, including utilizing one or more randomization algorithm, wherein the faux-manual markings mimic an appearance of manual markings on the structure in the real world.

2. The computer system of claim 1, wherein utilizing the one or more image-manipulation algorithm includes utilizing one or more of the following: a randomized geometry-based function and a parametric function.

3. The computer system of claim 2, wherein the parametric function is a Bézier curve.

4. The computer system of claim 1, wherein the one or more faux-manual markings includes a first faux-manual marking having characteristics comprising a first width, a first length, a first thickness, and a first density, and wherein generating the faux-manual markings comprises varying one or more of the first width, the first length, the first thickness, and the first density within the first faux-manual marking.

5. The computer system of claim 1, wherein the one or more faux-manual markings includes a first faux-manual marking having first characteristics comprising a first width, a first length, a first thickness, and a first density, and wherein the one or more faux-manual markings includes a second faux-manual marking having second characteristics comprising a second width, a second length, a second thickness, and a second density, and wherein generating the first and second faux-manual markings comprises varying one or more of the first characteristics compared to one or more of the second characteristics.

6. The computer system of claim 1, further comprising indicating levels of extent and/or severity of the one or more structure abnormality as colors of the faux-manual markings on the digital image.

7. The computer system of claim 1, further comprising indicating a level of confidence of the digital image of the structure containing the one or more structure abnormality as colors of the faux-manual markings on the digital image.

8. A computer system storing computer readable instructions that, when executed by the computer system, cause the computer system to perform the following: obtain results of an automated analysis of one or more digital images indicative of determinations of structure abnormalities of one or more portions of a structure depicted in the one or more digital images, wherein the automated analysis utilizes one or more of machine learning and artificial intelligence;
  apply, automatically, on the one or more digital images, standardized markings indicative of at least a location in the digital image of the structure abnormalities of the structure depicted in the digital image; and
  generate, automatically, one or more faux-manual markings on the digital image by modifying one or more of the standardized markings, utilizing one or more image-manipulation algorithm, wherein the faux-manual markings mimic an appearance of manual markings on the structure in the real world.

9. The computer system of claim 5, wherein generating the one or more faux-manual markings comprises utilizing one or more randomization algorithm.

10. A computer system storing computer readable instructions that, when executed by the computer system, cause the computer system to perform the following:
  obtaining results of an automated analysis of one or more digital images indicative of determinations of structure abnormalities of one or more portions of a structure depicted in the one or more digital images;
  creating, automatically, a report depicting the results including one or more of the digital images depicting the one or more portions of the structure showing the structure abnormalities; and
  generating, automatically, a plurality of faux-manual markings applied to the one or more digital images to indicate a location of the structure abnormalities on the one or more portions of the structure depicted in the one or more digital images, wherein the faux-manual markings mimic an appearance of manual markings on the structure in the real world, wherein generating the plurality of faux-manual markings comprises utilizing one or more randomization algorithm.

11. The computer system of claim 10, wherein generating, automatically, the plurality of faux-manual markings comprises utilizing one or more image-manipulation algorithm includes utilizing one or more of the following: a randomized geometry-based function and a parametric function.

12. The computer system of claim 11, wherein the parametric function is a Bézier curve.

13. The computer system of claim 10, wherein the plurality of faux-manual markings includes a first faux-manual marking having characteristics comprising a first width, a first length, a first thickness, and a first density, and wherein generating the plurality of faux-manual markings comprises varying one or more of the first width, the first length, the first thickness, and the first density within the first faux-manual marking.

14. The computer system of claim 10, wherein the plurality of faux-manual markings includes a first faux-manual marking having first characteristics comprising a first width, a first length, a first thickness, and a first density, and the plurality of faux-manual markings includes a second faux-manual marking having second characteristics comprising a second width, a second length, a second thickness, and a second density, and wherein generating the plurality of faux-manual markings comprises varying one or more of the first characteristics compared to one or more of the second characteristics.

15. The computer system of claim 10, further comprising indicating levels of extent and/or severity of the one or more structure abnormality as colors of the faux-manual markings on the digital image.

16. The computer system of claim 10, further comprising indicating a level of confidence of the digital image of the structure containing the one or more structure abnormality as colors of the faux-manual markings on the digital image.

17. A computer system storing computer readable instructions that, when executed by the computer system, cause the computer system to perform the following: obtaining results of an automated analysis of one or more digital images indicative of determinations of structure abnormalities of one or more portions of a structure depicted in the one or more digital images, wherein the automated analysis utilizes one or more of machine learning and artificial intelligence;
  creating, automatically, a report depicting the results including one or more of the digital images depicting the one or more portions of the structure showing the structure abnormalities; and
  generating, automatically, a plurality of faux-manual markings applied to the one or more digital image to indicate a location of the structure abnormalities on the one or more portions of the structure depicted in the one or more digital image, wherein the faux-manual markings mimic an appearance of manual markings on the structure in the real world.

18. A method, comprising:
  generating, automatically with one or more computer processor, from one or more digital images, determinations of structure abnormalities of one or more portions of a structure depicted in the one or more digital images utilizing one or more of machine learning and artificial intelligence;

applying, automatically with the one or more computer processors, on the one or more digital image, standardized markings indicative of a location in the digital image of the structure abnormalities of the structure depicted in the digital image; and generating, automatically with the one or more computer processors, one or more faux-manual markings by modifying one or more of the standardized markings, utilizing one or more image-manipulation algorithm, wherein the faux-manual markings mimic an appearance of manual markings on the structure in the real world.

* * * * *